United States Patent
Kim et al.

(10) Patent No.: US 9,801,174 B2
(45) Date of Patent: Oct. 24, 2017

(54) METHOD AND APPARATUS FOR OBTAINING IDENTIFIER OF SMALL CELL IN WIRELESS COMMUNICATION SYSTEM HAVING HIERARCHICAL CELL STRUCTURE

(75) Inventors: Tae-Young Kim, Seongnam-si (KR);
Youn-Sun Kim, Seongnam-si (KR);
Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 13/346,127

(22) Filed: Jan. 9, 2012

(65) Prior Publication Data

US 2012/0178454 A1 Jul. 12, 2012

(30) Foreign Application Priority Data

Jan. 10, 2011 (KR) .................. 10-2011-0002145
Feb. 15, 2011 (KR) .................. 10-2011-0013146

(51) Int. Cl.
*H04W 72/04* (2009.01)
*H04W 16/32* (2009.01)
*H04W 24/02* (2009.01)
*H04W 36/32* (2009.01)

(52) U.S. Cl.
CPC ........ *H04W 72/0426* (2013.01); *H04W 16/32* (2013.01); *H04W 24/02* (2013.01); *H04W 36/32* (2013.01)

(58) Field of Classification Search
CPC ............... H04W 84/045; H04W 36/30; H04W 36/0088; H04W 74/0833; H04W 36/00; H04W 36/0016; H04W 36/0061; H04W 36/0072; H04W 36/0077; H04W 16/16;
(Continued)

(56) References Cited

U.S. PATENT DOCUMENTS

| 7,280,828 | B1 * | 10/2007 | Shah ............................ 455/434 |
| 2003/0058811 | A1 * | 3/2003 | Shurvinton ................. 370/321 |
| 2007/0015511 | A1 * | 1/2007 | Kwun et al. ................. 455/436 |

(Continued)

FOREIGN PATENT DOCUMENTS

| KR | 10-2010-0020612 A | 2/2010 |
| WO | WO 2010018928 A2 * | 2/2010 |

OTHER PUBLICATIONS

Choi et al; An Efficient Femto-cell Scanning Scheme Using Network Assistance in IEEE 802.16e System; '11-01; vol. 36; No. 1; Jan. 31, 2011.

*Primary Examiner* — Thai Vu
(74) *Attorney, Agent, or Firm* — Jefferson IP Law, LLP

(57) ABSTRACT

A method and an apparatus for obtaining a small cell identifier in a wireless communication system having a hierarchical cell structure are provided. The method includes obtaining a small cell identifier of a terminal in a wireless communication system of a hierarchical cell structure, transmitting resource information allocated for a Random Access Channel (RACH) of a terminal to a small base station, receiving state information regarding the RACH of the terminal from the small base station, determining at least one small base station adjacent to the terminal using the state information regarding the RACH, and transmitting cell IDentifier (ID) information of the determined small base station to the terminal.

28 Claims, 14 Drawing Sheets

(58) Field of Classification Search
CPC . H04W 72/0426; H04W 36/32; H04W 16/32; H04W 24/02
USPC .......................... 455/436–444; 370/331–334
See application file for complete search history.

(56) References Cited

U.S. PATENT DOCUMENTS

| | | | |
|---|---|---|---|
| 2007/0032237 A1* | 2/2007 | Chang ............... | H04W 36/0083 455/436 |
| 2009/0191875 A1* | 7/2009 | Vujcic et al. ................. | 455/436 |
| 2010/0056160 A1* | 3/2010 | Kim .................. | H04W 36/0055 455/444 |
| 2010/0111047 A1* | 5/2010 | Yang et al. ................... | 370/336 |
| 2010/0208645 A1* | 8/2010 | Hamalainen et al. ........ | 370/315 |
| 2010/0260052 A1* | 10/2010 | Cho et al. ..................... | 370/241 |
| 2010/0323612 A1* | 12/2010 | Xu ........................ | H04B 7/022 455/7 |
| 2011/0014919 A1* | 1/2011 | Otte et al. ..................... | 455/442 |
| 2011/0143674 A1 | 6/2011 | Lim et al. | |
| 2011/0176534 A1* | 7/2011 | Subramanian ........ | H04J 3/0685 370/350 |

\* cited by examiner

METHOD AND APPARATUS FOR OBTAINING IDENTIFIER OF SMALL CELL IN WIRELESS COMMUNICATION SYSTEM HAVING HIERARCHICAL CELL STRUCTURE

PRIORITY

This application claims the benefit under 35 U.S.C. §119 (a) of a Korean patent application filed in the Korean Intellectual Property Office on Jan. 10, 2011 and assigned Serial No. 10-2011-0002145 and a Korean patent application filed in the Korean Intellectual Property Office on Feb. 15, 2011 and assigned Serial No. 10-2011-0013146, the entire disclosure of each of which is hereby incorporated by reference.

BACKGROUND OF THE INVENTION

1. Field of the Invention

The present invention relates to a wireless communication system having a hierarchical cell structure. More particularly, the present invention relates to an apparatus and method for improving system performance in a wireless communication system of a hierarchical cell structure.

2. Description of the Related Art

A cellular communication system provides a wireless communication system of a hierarchical cell structure where base stations having different cell coverage coexist for swift communication of a terminal. That is, the cellular communication system provides a communication system where a small cell such as a pico cell and a femto cell, and a macro cell coexist.

The wireless communication system of a hierarchical cell structure according to the related art applies the same wireless communication standard to a macro cell and a small cell, and provides various transmission techniques for providing data to a low speed user and a high speed user.

FIG. 1 illustrates a wireless communication system of a hierarchical cell structure according to the related art.

As illustrated in FIG. 1, the wireless communication system of the hierarchical cell structure may reduce a service shadow region generated in the case where only a macro base station 100 is used by allowing the macro base station 100 and a plurality of small base stations 110 and 112 to coexist, may extend a cell coverage region supportable by the macro base station 100, and may improve a data transmission rate that can be provided per area.

In the wireless communication system of the hierarchical cell structure according to the related art, a terminal receives a service from one of the macro base station 100 and a small base station 110. That is, when a first terminal 120 that receives a service from the macro base station 100 moves into the coverage region of the small base station 110, the first terminal 120 performs a handover procedure from the macro base station 100 to the small base station 110 to disconnect a connection with the macro base station 100 and try a connection to the small base station 110. However, when the first terminal 120 is moving at a high speed, since the first terminal 120 passes through the coverage region of the small base station 110 within a very short period of time, the first terminal 120 performs a handover procedure again. This frequent and unnecessary handover procedure increases the overhead of a system and reduces the performance of the system.

SUMMARY OF THE INVENTION

Aspects of the present invention are to address at least the above-mentioned problems and/or disadvantages and to provide at least the advantages described below. Accordingly, an aspect of the present invention is to provide a method for improving a system performance in a wireless communication system of a hierarchical cell structure.

Another aspect of the present invention is to provide a method and an apparatus for allowing a macro base station to support a low speed user and a high speed user, and allowing a small base station to support a low speed user in a wireless communication system of a hierarchical cell structure.

Still another aspect of the present invention is to provide a method and an apparatus for allowing a terminal to always maintain a connection with a macro base station and to perform an additional connection with a neighbor small base station depending on a position and speed in a wireless communication system of a hierarchical cell structure.

Yet another aspect of the present invention is to provide a method and an apparatus for obtaining synchronization with a small cell under a circumstance where a small base station does not transmit a preamble in a wireless communication system of a hierarchical cell structure.

Further another aspect of the present invention is to provide a method and an apparatus for allowing a small base station to obtain synchronization using a preamble of a macro base station in a wireless communication system of a hierarchical cell structure.

Still another aspect of the present invention is to provide a method and an apparatus for obtaining an identifier of a small cell under a circumstance where a small base station does not transmit a preamble in a wireless communication system of a hierarchical cell structure.

Yet another aspect of the present invention is to provide a method and an apparatus for allowing a small base station to receive a Random Access Channel (RACH) signal transmitted from a macro terminal to a macro base station to report the same to the macro base station, thereby allowing the macro base station to transmit an identifier of a small base station adjacent to the macro terminal to a terminal in a wireless communication system of a hierarchical cell structure.

Yet still another aspect of the present invention is to provide a method and an apparatus for allowing a macro terminal to receive a common pilot signal of a small base station using an identifier of a neighbor small base station received from a macro base station, and determine a neighbor small base station through this received pilot signal in a wireless communication system of a hierarchical cell structure.

In accordance with an aspect of the present invention, a method of a macro base station, for obtaining a small cell identifier of a terminal in a wireless communication system of a hierarchical cell structure is provided. The method includes transmitting resource information allocated for an RACH of a terminal to a small base station, receiving state information regarding the RACH of the terminal from the small base station, determining at least one small base station adjacent to a relevant terminal using the state information regarding the RACH, and transmitting cell IDentifier (ID) information of the determined small base station to the relevant terminal.

In accordance with another aspect of the present invention, a method of a small base station for obtaining a small cell identifier of a terminal in a wireless communication system of a hierarchical cell structure is provided. The method includes receiving resource information allocated for an RACH of a terminal from a macro base station, receiving a signal of an RACH transmitted by the terminal to the macro base station using the received resource information, measuring state information regarding the RACH using a signal of the received RACH, and transmitting the measured state information regarding the RACH to the macro terminal.

In accordance with still another aspect of the present invention, a method of a terminal, for obtaining an identifier of a small cell in a wireless communication system having a hierarchical cell structure is provided. The method includes transmitting an RACH signal to a macro base station, receiving cell ID information of at least one neighbor small base station from the macro base station, and receiving a common pilot signal from at least one small base station using the received cell ID information.

In accordance with yet another aspect of the present invention, an apparatus of a macro base station, for obtaining a small cell identifier of a terminal in a wireless communication system having a hierarchical cell structure is provided. The apparatus includes a transceiver for transmitting/receiving a signal to/from at least one of a terminal and a small base station, and a controller for controlling to transmit resource information allocated for an RACH of a terminal to a small base station, receive state information regarding the RACH of the terminal from the small base station, determine at least one small base station adjacent to a relevant terminal using the state information regarding the RACH, and transmit cell ID information of the determined small base station to the relevant terminal.

In accordance with another aspect of the present invention, an apparatus of a small base station, for obtaining a small cell identifier of a terminal in a wireless communication system of a hierarchical cell structure is provided. The apparatus includes a transceiver for transmitting/receiving a signal to/from at least one of a terminal and a macro base station, and a controller for controlling to receive resource information allocated for an RACH of a terminal from the macro base station, receive a signal of an RACH transmitted by the terminal to the macro base station using the received resource information, measure state information regarding the RACH using a signal of the received RACH, and transmit the measured state information regarding the RACH to the macro terminal.

In accordance with a further aspect of the present invention, an apparatus of a terminal, for obtaining an identifier of a small cell in a wireless communication system having a hierarchical cell structure is provided. The apparatus includes a transceiver for transmitting/receiving a signal to/from at least one of a macro base station and a small base station, and a controller for controlling to transmit an RACH signal to the macro base station, receive cell ID information of at least one neighbor small base station from the macro base station, and receive a common pilot signal from at least one small base station using the received cell ID information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for obtaining an identifier of a small cell under a circumstance where a small base station does not transmit a preamble in order to improve a system performance in a wireless communication system of a hierarchical cell structure.

Exemplary embodiments of the present invention provide a method and an apparatus for allowing a macro base station to support both low speed users and high speed users and allowing a small base station to support only low speed users in order to prevent high speed user equipment from performing an unnecessary handover frequently. In addition, an exemplary embodiment of the present invention allows a terminal to always perform an initial access on a macro cell, and maintain a connection to the macro cell, so that a small cell does not transmit a preamble. As described above, additional data is transmitted during a section in which the small cell does not transmit a preamble, so that a transmission rate may improve.

Figure 1:
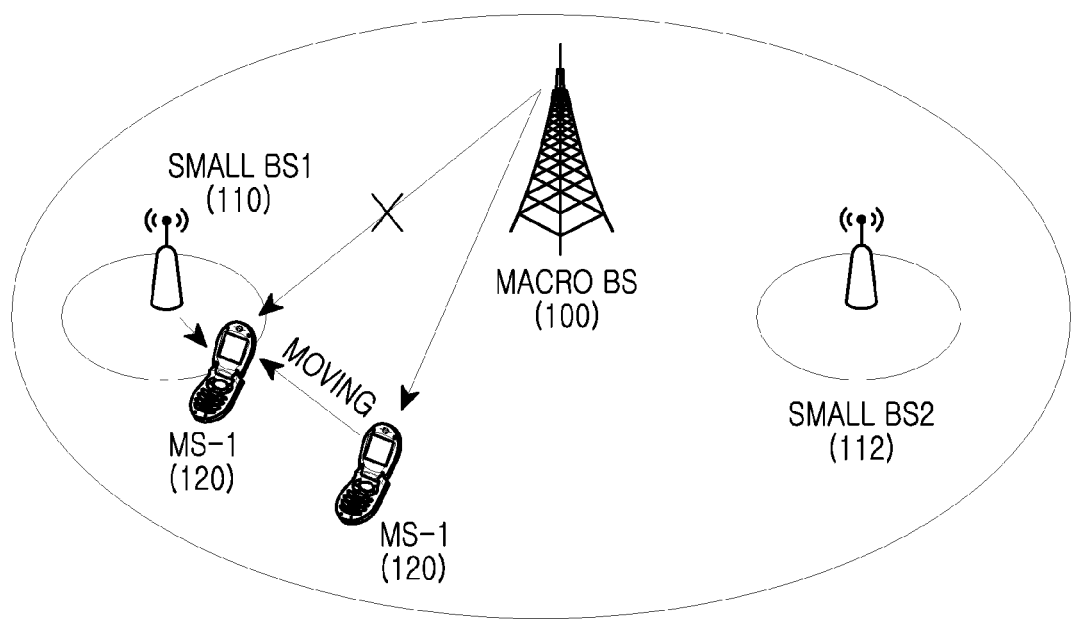
FIG. 1 is a view illustrating a wireless communication system of a hierarchical cell structure according to the related art.
Figure 2:
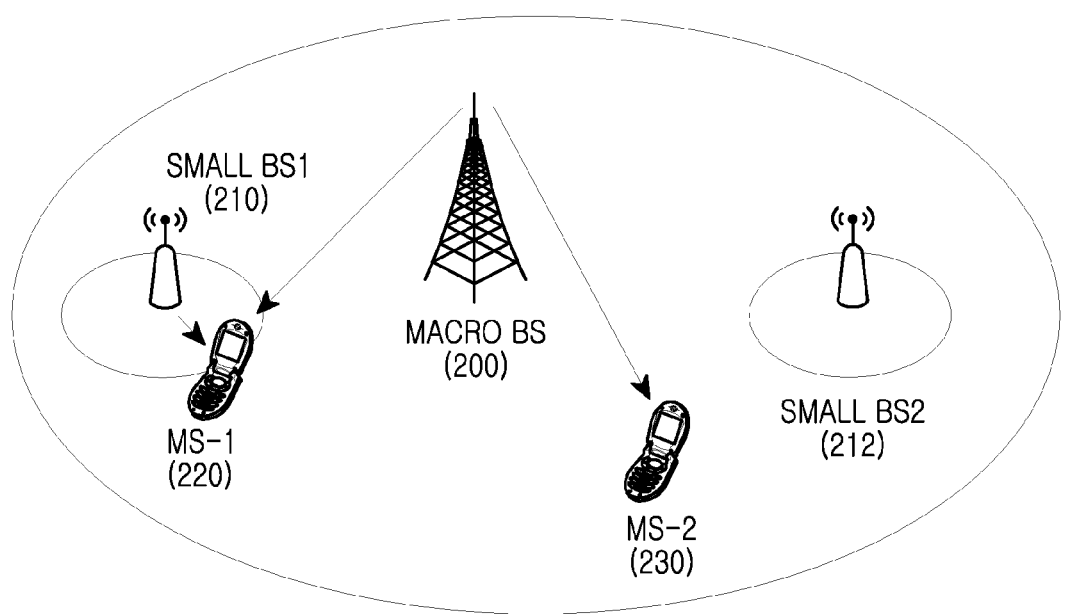
FIG. 2 is a view illustrating a system operating method in a wireless communication system of a hierarchical cell structure according to an exemplary embodiment of the present invention.

FIG. 2 is a view illustrating a system operating method in a wireless communication system of a hierarchical cell structure according to an exemplary embodiment of the present invention.

Referring to FIG. 2, a second terminal MS-2 230 is a User Equipment (UE) moving at a high speed. The second terminal MS-2 230 performs an initial access on a macro base station 200 to receive a service. At this point, since the second terminal 230 is a user at a high speed, the second terminal 230 does not perform a handover to a second small base station 212 but maintains a connection with the macro base station 200 even when the second terminal 230 moves to the region of the second small base station 212.

In contrast, a first terminal 220 is a user moving at a low speed. The first terminal 220 performs an initial access on the macro base station 200 to receive a service. At this point, since the first terminal 220 is a user at a low speed, when the first terminal 220 moves into the region of the small base station 210, the first terminal 220 maintains a connection with the macro base station 200 and performs an additional connection with the small base station 210. That is, the first terminal 220 receives a high speed data service from the small base station 210 and maintains a connection with the macro base station 200.

As described above, all terminals perform an initial access on the macro base station 200 to perform a connection, and always maintain a connection with the macro base station 200. That is, during the initial access, all the terminals receive a preamble signal transmitted from the macro base station 200 to obtain synchronization, and may obtain a cell identifier (ID) (and/or a sector ID). Therefore, an exemplary embodiment of the present invention assumes that the small base station 210 does not transmit a preamble signal for obtaining initial synchronization and obtaining a cell ID (and/or a sector ID). Since the small base station 210 may transmit other data during a section for transmitting the preamble via this transmission structure, a data transmission rate may improve.

However, since the small base station does not transmit a preamble signal, a need exists for a method for allowing the UE to obtain synchronization with respect to the small base station 210 and obtain a cell ID (and/or a sector ID) with respect to the small base station 210 in preparation for a handover circumstance of the UE.

In the following, it is assumed that a terminal performs an initial access to a macro base station to connect thereto. At this point, a method for obtaining synchronization of a neighbor small base station and obtaining a cell ID (and/or a sector ID) is described.

Figure 3A:
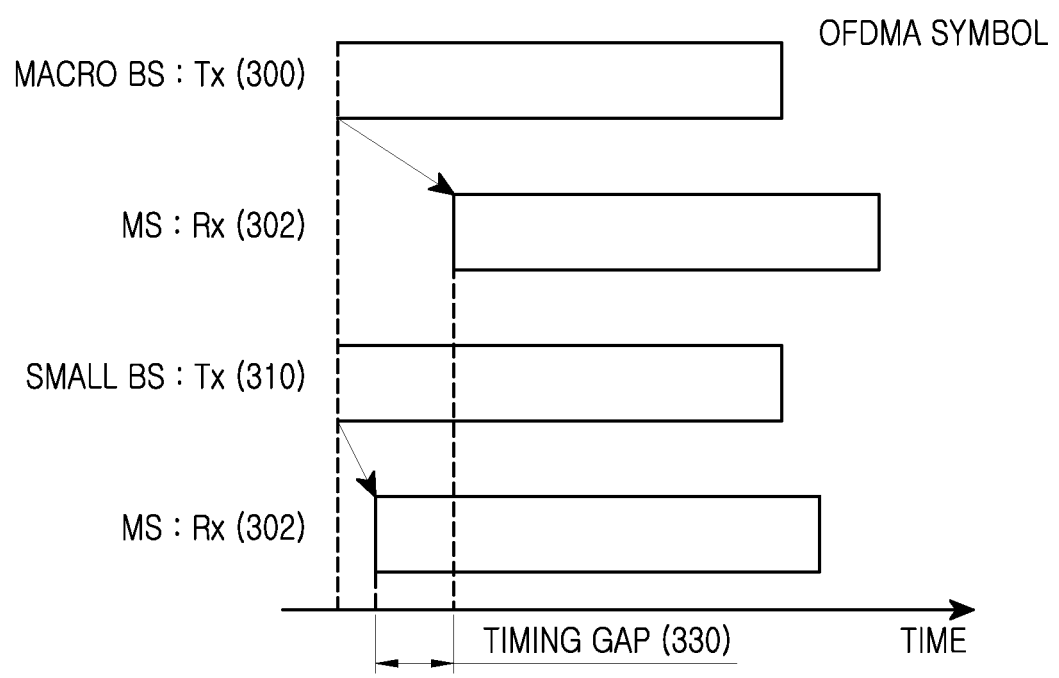
FIG. 3A is a view illustrating a reception point of a terminal with respect to a transmission signal of a macro base station and a small base station in a wireless communication system of a hierarchical cell structure according to an exemplary embodiment of the present invention.

FIG. 3A is a view illustrating a reception point of a terminal with respect to a transmission signal of a macro base station and a small base station in a wireless communication system of a hierarchical cell structure according to an exemplary embodiment of the present invention.

Referring to FIG. 3A, assuming that a macro base station 300 and a small base station 310 simultaneously transmit a signal using a Global Positioning System (GPS) signal, since the macro base station 300 has a radius of hundreds of meters to several kilometers, and the small base station 310 has a radius of tens of meters, a time difference may occur in receiving a signal of the macro base station 300 and a signal of the small base station 310 depending on the position of a terminal. For example, a terminal 302 positioned at a distance away from the macro base station 300 and relatively close to the small base station 310 receives a signal transmitted from the small base station 310, and the terminal 302 receives a signal transmitted from the macro base station 300 after a specific time 330.

However, since the small base station, according to an exemplary embodiment of the present invention, does not transmit a preamble, the terminal cannot obtain synchronization with respect to the small base station separately. Therefore, a technique for removing a reception point difference 300 of the terminal needs to be suggested. Furthermore, when the small base station is installed in an indoor space, the small base station does not use a GPS in many cases. Therefore, a technique for synchronization inside a system without using the GPS needs to be proposed. Hereinafter, an exemplary technique for obtaining synchronization of the small base station that does not transmit a preamble is described.

Figure 3B:
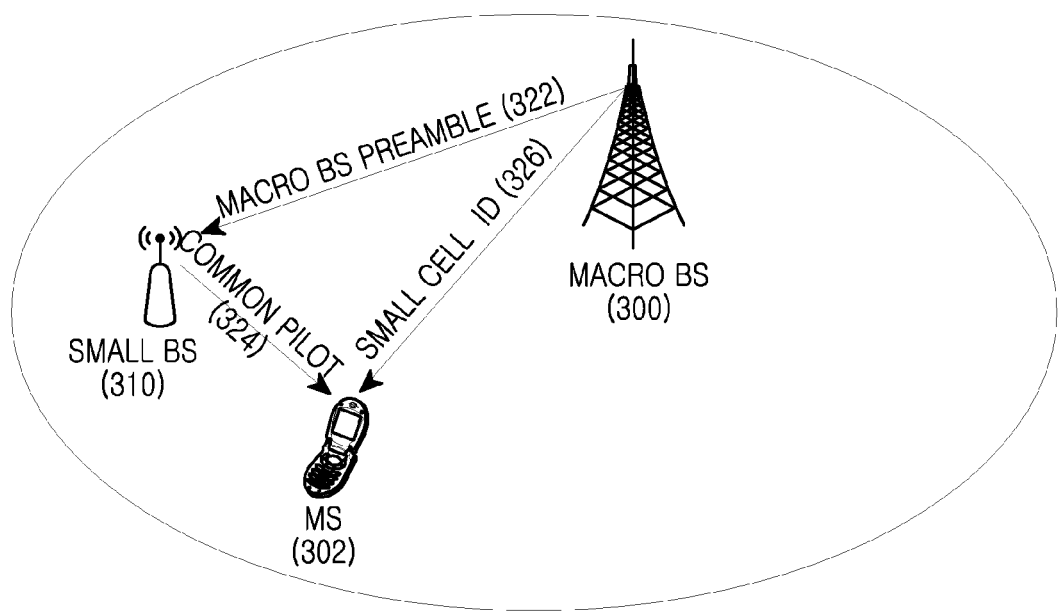
FIG. 3B is a view illustrating a method for obtaining synchronization in a wireless communication system of a hierarchical cell structure according to an exemplary embodiment of the present invention.
Figure 3C:
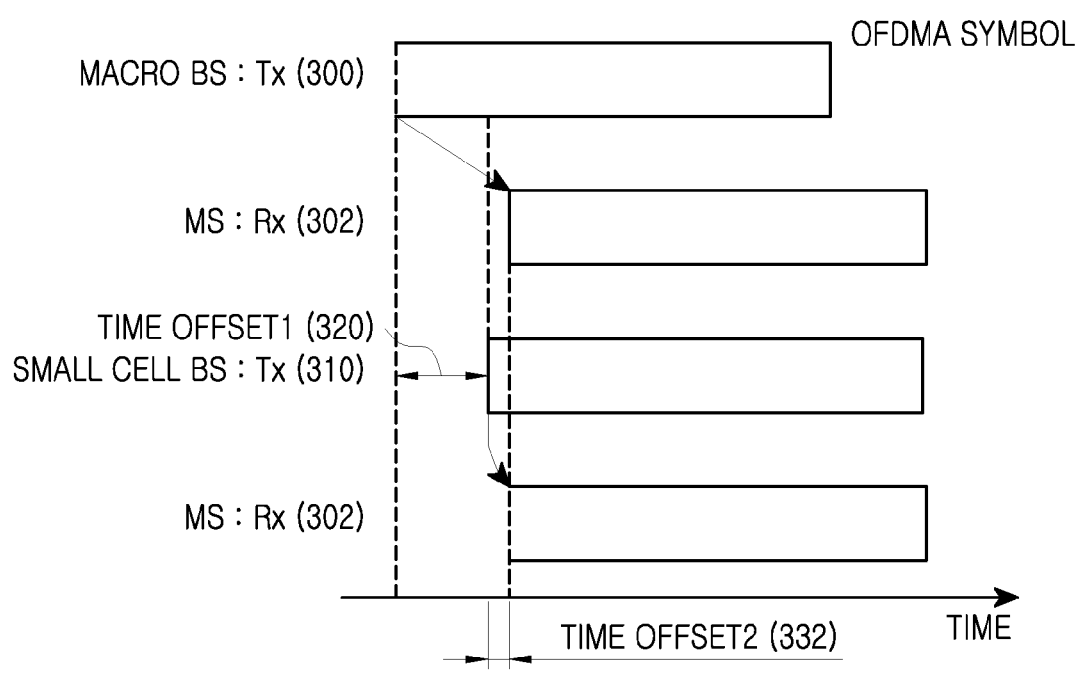
FIG. 3C is a view illustrating a reception point of a terminal with respect to a transmission signal of a macro base station and a small base station in a wireless communication system of a hierarchical cell structure according to an exemplary embodiment of the present invention.

FIG. 3B is a view illustrating a method for obtaining synchronization in a wireless communication system of a hierarchical cell structure according to an exemplary embodiment of the present invention, and FIG. 3C is a view illustrating a reception point of a terminal with respect to a transmission signal of a macro base station and a small base station in a wireless communication system of a hierarchical cell structure according to an exemplary embodiment of the present invention.

Referring to FIG. 3B, a small base station 310 receives a preamble signal 322 transmitted from a macro base station 300 to synchronize with the macro base station 300 in time and a frame, and transmits a common pilot signal 324 to a terminal 302 positioned inside the region of the small base station according to the matched synchronization. That is, as illustrated in FIG. 3C, the small base station 310 may receive a preamble signal 322 transmitted from the macro base station 301 to obtain a first time offset 320 for controlling a transmission point so that the terminal 302 may receive a signal of the macro base station 300 and a signal of the small base station 310 at a similar point, and the small base station 310 may transmit a signal to the terminal 302 according to the obtained first time offset 320. Here, the first time offset 320 is a value corresponding to a distance between the small base station and the macro base station, and may be determined using the received preamble. Through this, the small base station 310 and the terminal 302 may be approximately synchronized with each other.

Of course, since the time/frame of the small base station 310 and the terminal 302 are not accurately synchronized, the terminal 302 may correct a time/frame synchronization error using a reference signal transmitted from the small base station 310 in order to obtain accurate time/frame synchronization between the small base station 310 and the terminal 302.

That is, the terminal 302 that has performed an initial access on the macro base station 301 to obtain synchronization receives a cell ID 326 of the small base station from the macro base station 300 to receive a common pilot signal 324 for the small base station, thereby obtaining a second time offset 332 for the small base station to obtain accurate synchronization. At this point, all small base stations synchronize with the macro base station via the above-described method and transmit a signal to a terminal according to the matched synchronization, so that a signal which the terminal has received from a plurality of small base stations may be received at a point similar to a point of a signal received from the macro base station, particularly, within a Cyclic Prefix (CP). By doing so, interference avoidance techniques between small base stations may be applied. At this point, the second time offset 332 may change depending on a cell radius of a small base station.

Here, even when the terminal is simultaneously connected with the macro base station and the small base station, since it is not realistic that the macro base station and the small base station have different time synchronization, it is assumed that they have the same time and the same frame.

Figure 4A:
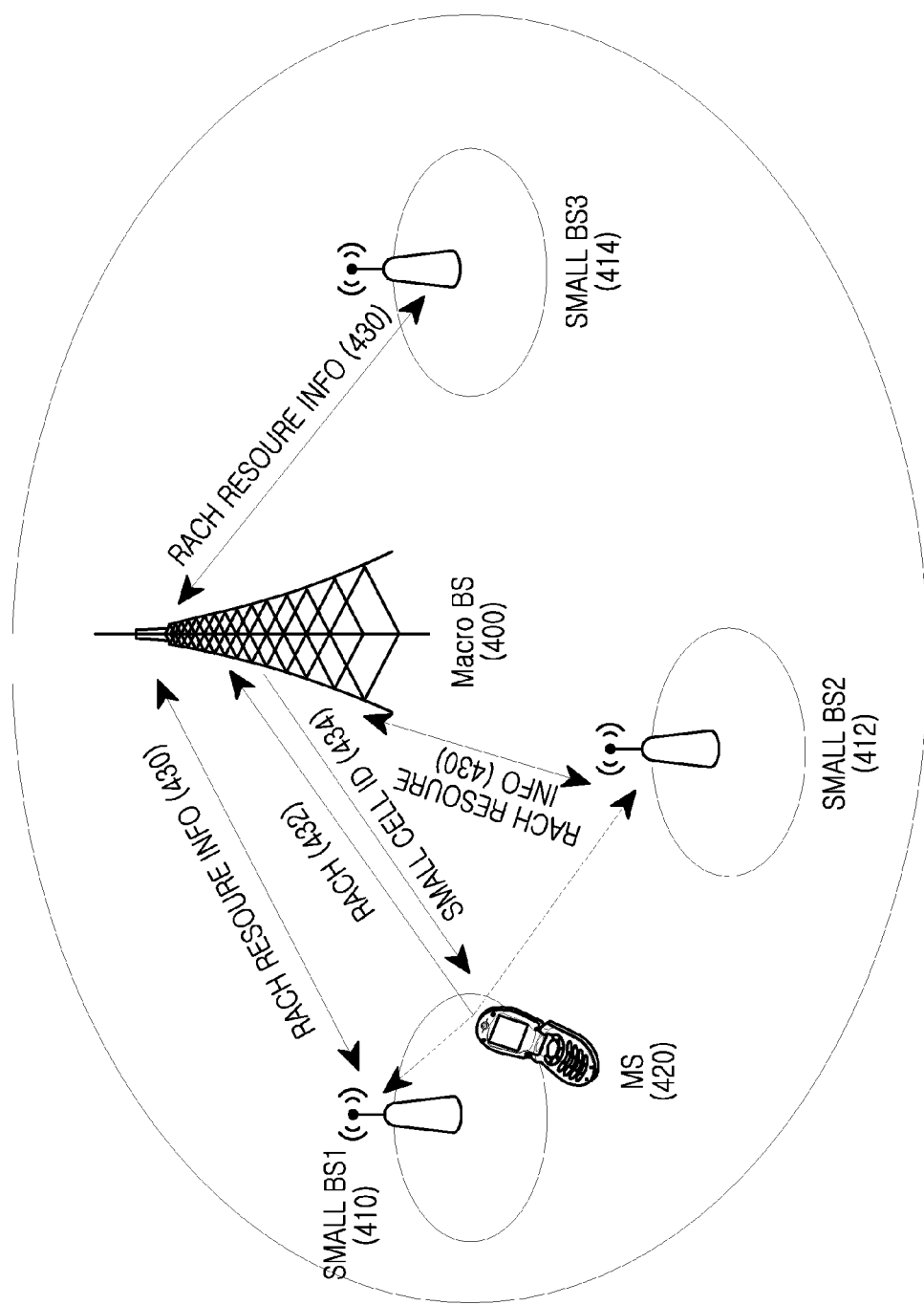
FIG. 4A is a view illustrating a method for allowing a macro terminal to obtain a cell identifier of a small base station in a wireless communication system of a hierarchical cell structure according to an exemplary embodiment of the present invention.

FIG. 4A is a view illustrating a method for allowing a macro terminal to obtain a cell identifier of a small base station in a wireless communication system of a hierarchical cell structure according to an exemplary embodiment of the present invention.

Referring to FIG. 4A, first, a macro base station 400 shares resource information for a Random Access Channel (RACH) 430 of a terminal allocated by the macro base station with small base stations 410, 412, 414 positioned in a neighborhood. Here, the resource information includes a point at which the terminal transmits the RACH and sequence code information of the RACH used by the terminal. At this point, the macro base station 400 and each of the small base stations 410, 412, 414 transmit and receive a signal via a wired network.

The terminal 420 connected to the macro base station 400 periodically transmits an RACH signal 432 to the macro base station 400 to obtain synchronization and fine-control the obtained synchronization. At this point, the small base stations 410 and 412 may receive an RACH signal which the terminal 420 transmits to the macro base station 400 using resource information of an RACH obtained from the macro base station 400. Of course, at this point, a third small base station 414 distant from the terminal 420 cannot receive an RACH signal of the terminal 420.

The small base stations 410 and 412 that have received the RACH signal measure state information of the RACH, and reports the measured channel state information to the macro base station 400.

Then, the macro base station 400 determines small base stations adjacent to the terminal 420 based on the state information of the RACH reported from the small base stations 410 and 412, and transmits a neighbor base station list including a cell ID (and/or a sector ID) of neighbor small base stations.

Through this method, the terminal 420 may obtain cell ID (and/or sector ID) information 434 of neighbor small base stations, and perform a handover on the neighbor small base stations through this.

However, the neighbor base station list received from the macro base station 400 may include invalid cell ID (and/or sector ID) information 434. Therefore, the terminal 420 needs to receive the neighbor base station list from the macro base station 400, and then determine whether small base stations included in the list is a base station actually neighboring the terminal 420. The description thereof is described below in detail with reference to FIG. 4B.

Figure 4B:
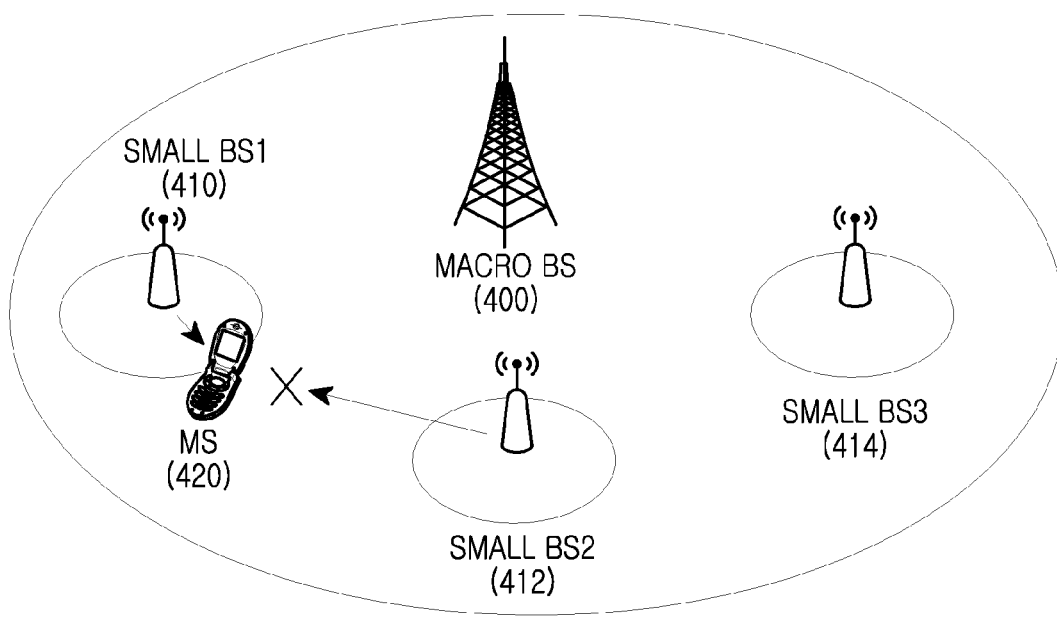
FIG. 4B is a view illustrating a method for allowing a macro terminal to determine a neighbor small base station in a wireless communication system of a hierarchical cell structure according to an exemplary embodiment of the present invention.

FIG. 4B is a view illustrating a method for allowing a macro terminal to determine a neighbor small base station in a wireless communication system of a hierarchical cell structure according to an exemplary embodiment of the present invention.

Referring to FIG. 4B, the terminal 420 is positioned at a region adjacent to the first small base station 410 and the second small base station 412 compared to the macro base station 400. Therefore, the first small base station 410 and the second small base station 412 may receive an RACH signal which the terminal 420 periodically transmits to the macro base station 400, and report state information for the RACH to the macro base station 400.

Then, the macro base station 400 determines a small base station adjacent to the terminal 420 according to a preset method based on the reported channel state information. At this point, since the first small base station 410 and the second small base station 412 are positioned relatively close to the terminal 420 compared to the macro base station 400, a channel state reported by the first small base station 410 and a channel state reported by the second small base station 412 may be better than a channel state which the macro base station 400 has measured with respect to the terminal 420. Accordingly, the macro base station 400 may determine the first small base station 410 and the second small base station 412 as small base stations adjacent to the terminal 400, and transmit a neighbor base station list including a cell ID (and/or sector ID) to the terminal 400.

However, since a small base station uses low power, the terminal 420 may be positioned at the coverage region of the first small cell base station 410 and may not be positioned at the coverage region of the second small cell base station 412. Therefore, even though the terminal 420 cannot receive service from the second small base station 412, the terminal 420 attempts handover to the second small base station 412 according to the neighbor base station list received from the macro base station 400 and the handover fails.

To address this problem, in an exemplary implementation, the terminal 420 receives a neighbor base station list from the macro base station 400, receives a common pilot signal from respective small neighbor base stations included in the neighbor base station list, and determines whether downlink data can be received from each small base station, thereby allowing the terminal 420 to finally determine a neighbor small base station for itself.

A method and an apparatus for allowing a terminal to obtain synchronization and a cell identifier of a small base station, and perform a handover from a macro base station to the small base station are described in more detail with reference to FIGS. 3 and 4.

Figure 5:
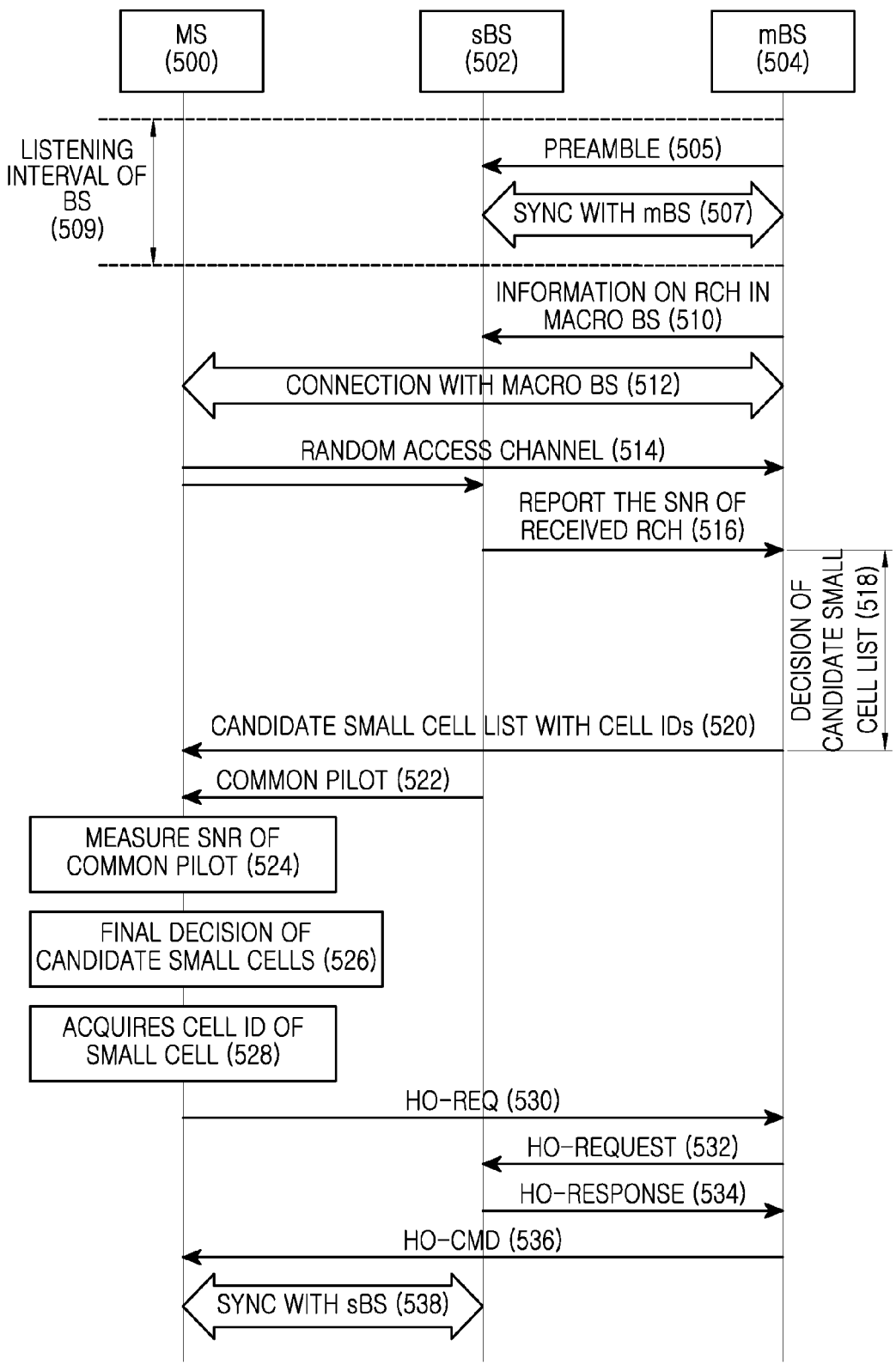
FIG. 5 is a view illustrating a signal flow in which a macro terminal obtains synchronization with respect to a small base station and a cell identifier to perform a handover in a wireless communication system of a hierarchical cell structure according to an exemplary embodiment of the present invention.

FIG. 5 is a view illustrating a signal flow in which a macro terminal obtains synchronization with respect to a small base station and a cell identifier to perform a handover in a wireless communication system of a hierarchical cell structure according to an exemplary embodiment of the present invention. Here, though one small base station has been exemplarily described for convenience in description, the same method is applicable to a plurality of small base stations.

Referring to FIG. 5, first, a macro base station 504 transmits a preamble every preset period in step 505. At this point, a small base station 502 suspends providing a service to terminals connected to the small base station and receives a preamble of the macro base station 504 during a preset listening interval 509.

The small base station 502 obtains time/frame synchronization with the macro base station 504 using the received preamble in step 507. That is, the small base station 502 determines a time offset that may occur due to a difference in a distance from the macro base station and determines a signal transmission point for a terminal existing inside a region of the small base station 502 according to the time offset. At this point, the time offset may be determined depending on a distance between the macro base station and the small base station, so that small base stations whose distance from the macro base station is different may have different time offsets. As described above, the small base station 502 synchronizes in time/frame with the macro base station 504 and then transmits a signal to a terminal 500 inside the region of itself, thereby achieving approximate time/frame synchronization between the small base station 502 and the terminal 500.

Meanwhile, the macro base station 504 transmits resource information which the macro base station 504 allocated for an RACH of a terminal to a small base station 502 positioned in the neighborhood in step 510. That is, the macro base station 504 transmits resource information including an RACH transmission point of the terminal and sequence code information of an RACH used by the terminal to the small base station 502. At this point, the macro base station 504 may transmit resource information allocated for the RACH to the small base station 502 via a wired network connected with the small base station 502, and may transmit the resource information allocated for the RACH to the small base station 502 via a wireless network depending on system settings and an operation method.

Meanwhile, the terminal 200 performs an initial access procedure on the macro base station 504 to connect with the macro base station 504 in step 512, and periodically transmits an RACH signal to the macro base station 504 in order to obtain synchronization in step 514. At this point, the macro base station 504 receives an RACH signal transmitted from the terminal 500. According to an exemplary embodiment of the present invention, the small base station 502 receives an RACH signal transmitted from the terminal 500. That is, the small base station 502 may receive an RACH signal which the terminal 500 transmits to the macro base station 504 using resource information received from the macro base station 504 in step 510.

The small base station 502 that has received the RACH signal of the terminal 500 measures state information for the RACH and reports the measured channel state information to the macro base station 504 in step 516. That is, the small base station 502 may measure signal reception strength or a Signal-to-Noise Ratio (SNR) for the RACH, and report the same to the macro base station 504. Here, the signal reception strength or the SNR for the RACH measured by the small base station 502 may be an index representing a relative distance between the terminal 500 corresponding to the RACH and the small base station 502. At this point, the small base station 502 may transmit the measured channel state information to the macro base station 504 via a wired network connected to the macro base station 504, and may transmit the measured channel state information to the macro base station 504 via a wireless network depending on system settings and an operation method.

The macro base station 504 determines small base stations adjacent to the terminal 500 based on the channel state information reported from the small base station 502 in step 518. Here, the macro base station 504 receives channel state information from each of a plurality of small base stations, compares the received channel state information of each small base station with a threshold, and may determine small base stations whose channel state information is equal to or greater than the threshold as small base stations adjacent to the terminal 500. In addition, the macro base station 504 receives channel state information from each of the plurality of small base stations, measures state information for an RACH of the terminal 500, compares the received channel state information of each small base station with the channel state information measured by the macro base station 504, and may determine small base stations whose channel state information is equal to or greater than the channel state information measured by the macro base station 504 as small base stations adjacent to the terminal 502. Here, a description is made based on the assumption that the small base station 502 is determined as a small base station adjacent to the terminal.

When the small base stations adjacent to the terminal 500 are determined, the macro base station generates a candidate neighbor base station list including cell IDs (and/or sector IDs) of the determined small base stations, and proceeds to step 520 to transmit the candidate neighbor base station list to the terminal 500.

Meanwhile, the small base station that has reported the channel state information to the macro base station 504 in step 514 periodically transmits a common pilot signal in step 522. Here, a common pilot signal transmission point of the small base station 502 may be determined based on a preamble reception point of the macro base station 504.

The terminal 500 receives a candidate neighbor base station list from the macro base station in step 520, and receives a common pilot signal of the small base station 502 included in the candidate neighbor base station list in step 522. Here, the terminal 500 may receive a common pilot signal of respective small base stations using cell ID (and/or sector ID) information of respective small base stations included in the candidate neighbor base station list. At this point, since a common pilot signal transmitted by all base stations is specialized for a cell ID of a relevant base station and transmitted, the terminal 500 may receive cell IDs of neighbor small base stations from the macro base station 504, and then receive a common pilot signal transmitted from the small base station 502.

The terminal 500 that has received the common pilot signal of the small base station 502 measures reception strength or an SNR of the common pilot signal, and compares the measured value with a threshold to determine whether it can receive downlink data from the relevant small base station 502 in step 524. Here, when the reception strength or the SNR of the common pilot signal received from a specific small base station is equal to or greater than the threshold, the terminal 500 determines that it can receive downlink data from the specific small base station. In contrast, when the reception strength or the SNR of the common pilot signal received from the specific small base station is less than the threshold, the terminal 500 may determine that it cannot receive downlink data from the specific small base station in step 526.

The terminal 500 proceeds to step 528 to determine small base stations from which downlink data can be received as handover candidate neighbor base stations of the terminal 500, and determine cell IDs (and/or sector IDs) of the determined handover candidate neighbor base stations from a handover candidate neighbor base station list received in step 520.

Thereafter, the terminal 500 determines whether a circumstance needing a handover to a small base station determined as a neighbor base station of the terminal 500 occurs, and when it is determined to be the circumstance needing the handover, the terminal 500 transmits a handover request message for a neighbor small base station to the macro base station 504 in step 530. Here, to determine whether the circumstance needing the handover occurs, conventional well known methods may be used.

Thereafter, the macro base station 504 that has received the handover request message transmits a handover request message to the neighbor small base station serving as a handover target in step 532, and the small base station 502 transmits a handover response message representing that a handover is possible to the macro base station 504 in step 534. Then, the macro base station transmits a handover command message commanding a handover to the neighbor small base station 502 to the terminal 500 in step 536. The terminal proceeds to step 538 to precisely correct a time/frame synchronization error for the small base station based on a common pilot signal received from the small base station 502 to obtain accurate time/frame synchronization. Thereafter, the terminal 500 and the small base station 502 perform a handover according to the obtained time/frame synchronization. Of course, at this point, the terminal 500 may maintain a connection with the macro base station 504.

In the above description, step 505 to step 509 are procedures for obtaining synchronization for a small base station, and are not essential elements of the present invention.

Figure 6:
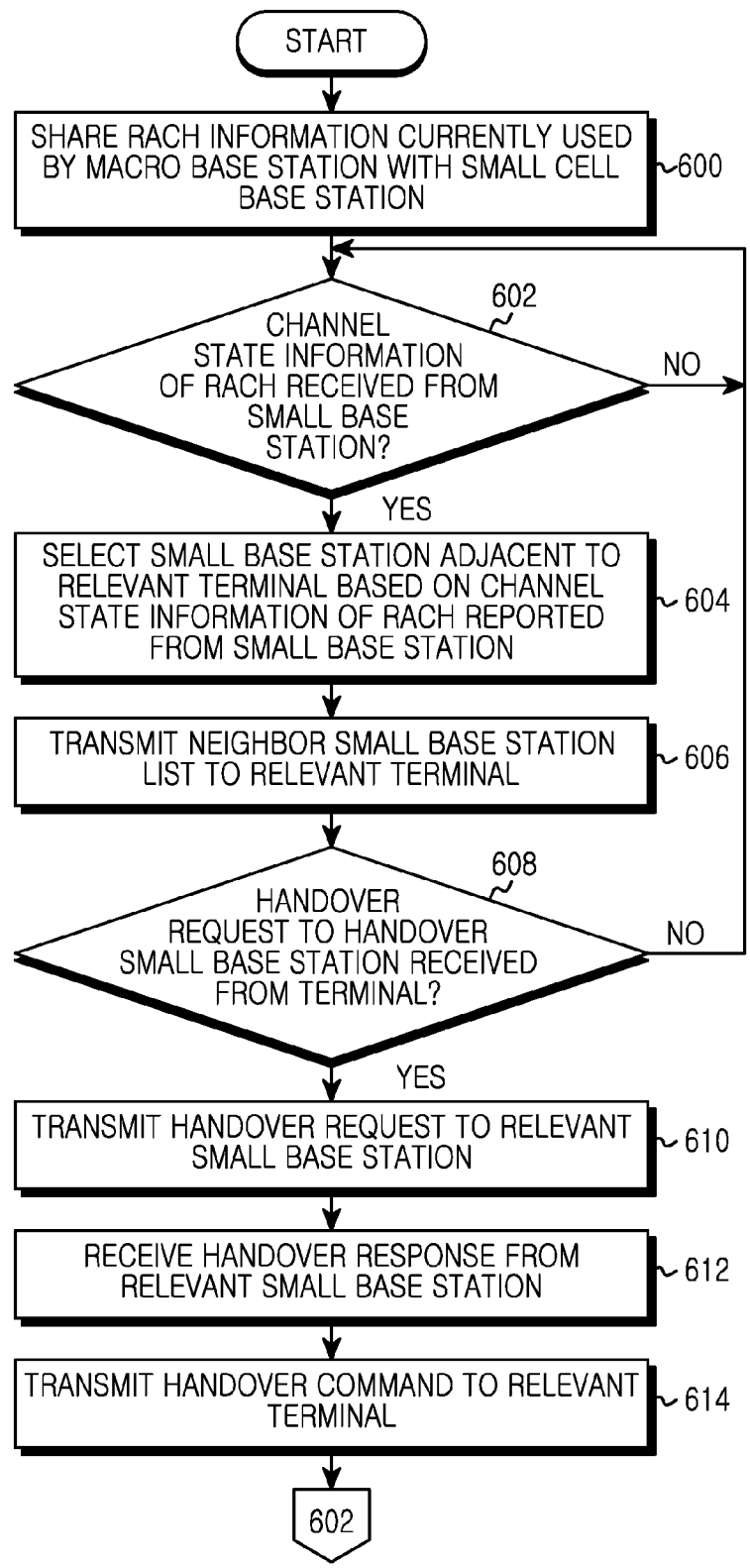
FIG. 6 is a flowchart illustrating an operation of a macro base station in a wireless communication system of a hierarchical cell structure according to an exemplary embodiment of the present invention.

FIG. 6 is a flowchart illustrating an operation of a macro base station in a wireless communication system of a hierarchical cell structure according to an exemplary embodiment of the present invention.

Referring to FIG. 6, the macro base station transmits resource information allocated for an RACH of a terminal to a small base station positioned in the neighborhood in step 600. At this point, the macro base station may transmit resource information allocated for the RACH to the small base station via a wired network connected with the small base station, and may transmit the resource information allocated for the RACH to the small base station via a wireless network depending on system settings and an operation method.

The macro base station determines whether channel state information for the RACH of the terminal is received from the small base station in step 602. When the channel state information for the RACH of the terminal is received from the small base station, the macro base station proceeds to step 604 and selects a neighbor small base station of the terminal corresponding to the RACH based on the channel state information for the RACH received from the small base station. Here, the macro base station compares channel state information for an RACH received from each of a plurality of small base stations with a preset threshold, or compares the channel state information with channel state information measured by the macro base station. The macro base station may determine a small base station adjacent to the relevant terminal depending on the comparison result. Here, the channel state information measured by the macro base station denotes signal reception strength or an SNR of the macro base station with respect to an RACH of the terminal measured by small base stations.

The macro base station transmits a candidate neighbor base station list including selected neighbor small base stations to the relevant terminal in step 606.

The macro base station proceeds to step 608 and determines whether a handover request message to a neighbor small base station is received from the terminal. When the handover request message is not received, the macro base station returns to step 602 to re-perform subsequent steps.

In contrast, when the handover request message is received, the macro base station proceeds to step 610 and transmits a handover request message to a small base station serving as a handover target of the terminal, receives a handover response message from the small base station in step 612, and transmits a handover command message to the relevant terminal in step 614. Thereafter, the macro base station returns to step 602 and performs the subsequent steps.

Figure 7:
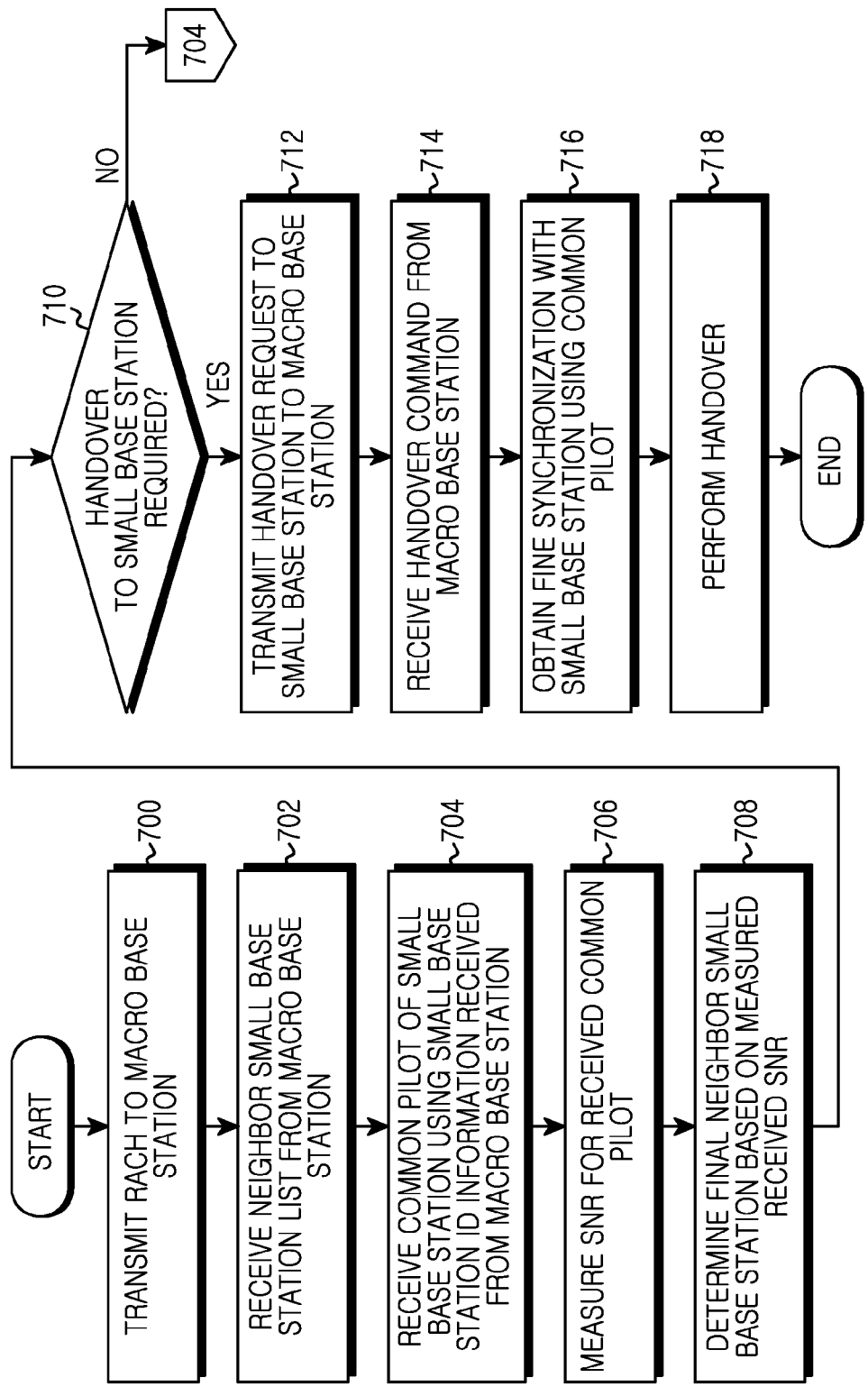
FIG. 7 is a flowchart illustrating an operation procedure of a macro terminal in a wireless communication system of a hierarchical cell structure according to an exemplary embodiment of the present invention.

FIG. 7 is a flowchart illustrating an operation procedure of a macro terminal in a wireless communication system of a hierarchical cell structure according to an exemplary embodiment of the present invention.

Referring to FIG. 7, the terminal transmits an RACH signal to a macro base station every preset period in order to obtain synchronization and fine-control synchronization with the macro base station that is currently being connected in step 700.

The terminal receives a candidate neighbor base station list representing neighbor small base stations from the macro base station in step 702, proceeds to step 704 to receive a common pilot signal of relevant small base stations using cell IDs (and/or sector IDs) of small base stations included in the received candidate neighbor base station list.

The terminal measures reception strength or an SNR of the common pilot signal received from the small base stations in step 706, and finally determines a small base station adjacent to the terminal using the measured reception strength or SNR of the common pilot signal in step 708. That is, the terminal compares the measured reception strength or SNR of the common pilot signal with a preset threshold to determine whether it can receive downlink data from the relevant small base station depending on the comparison result, and determines small base stations from which downlink data can be received as small base stations adjacent to the terminal.

The terminal determines whether a circumstance needing a handover to one of the finally determined small base stations occurs in step 710. When the handover is not needed, the terminal returns to step 704. When the handover is needed, the terminal proceeds to step 712 to transmit a handover request message for a neighbor small base station to the macro base station, and receive a handover command message from the macro base station in step 714.

The terminal proceeds to step 716 and precisely corrects a time/frame synchronization error based on a common pilot signal of a small base station received in step 704 to obtain accurate time/frame synchronization. The terminal performs a handover to the relevant small base station according to the obtained time/frame synchronization in step 718. The algorithm according to an exemplary embodiment of the present invention ends. At this point, the terminal may continue to maintain a connection with the macro base station.

Figure 8:
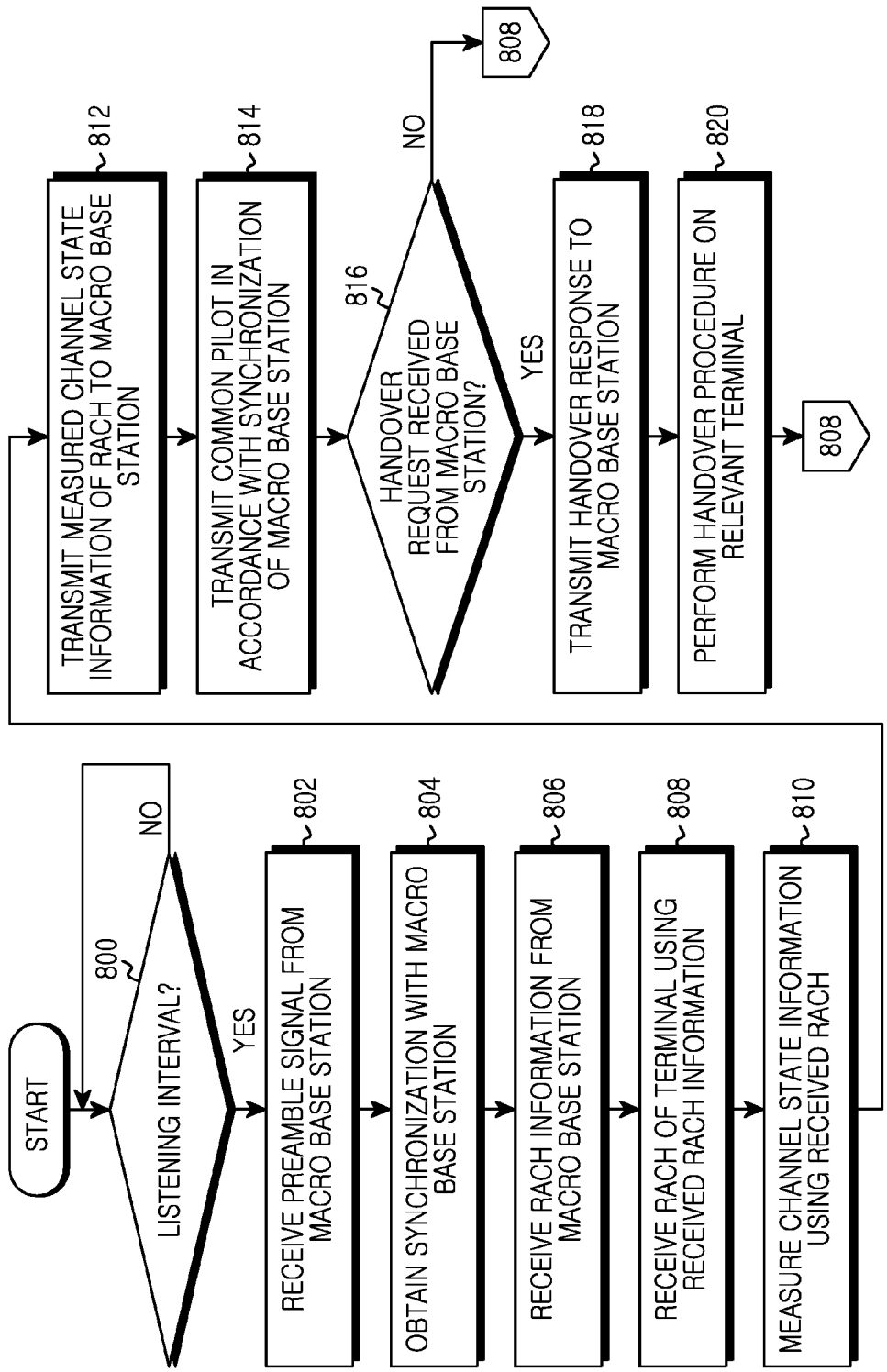
FIG. 8 is a flowchart illustrating an operation procedure of a small base station in a wireless communication system of a hierarchical cell structure according to an exemplary embodiment of the present invention.

FIG. 8 is a flowchart illustrating an operation procedure of a small base station in a wireless communication system of a hierarchical cell structure according to an exemplary embodiment of the present invention.

Referring to FIG. 8, the small base station determines whether a section is a listening interval set in advance for receiving a preamble of a macro base station in step 800. The listening interval denotes an interval for temporally suspending service providing for terminals connected to the small base station, and receiving a preamble of the macro base station. The reception of the preamble may be performed only one time initially or repeatedly performed every preset period depending on a company or a designer.

When a section is the listening interval, the small base station receives a preamble signal from the macro base station in step 802, and obtains time/frame synchronization for the macro base station using the received preamble in step 804. Through this, the small base station may approximately match time/frame synchronization with terminals inside the small base station. Here, the small base station predicts a time for a transmission frame of the macro base station via the preamble signal, obtains a time offset value depending on a difference between a distance from the macro base station using a transmission time and a reception time of the preamble signal, and applies the time offset value to the predicted transmission frame time to determine a transmission time of the small base station.

The small base station receives resource information allocated for an RACH of the terminal by the macro base station from the macro base station in step 806. At this point, the small base station may receive the resource information via a wired network or a wireless network.

The small base station receives a signal of an RACH which a neighbor terminal transmits to the macro base station using resource information for an RACH of a terminal allocated by the macro base station in step 808, and proceeds to step 810 to measure channel state information for the RACH using the received signal, and transmit the measured channel state information to the macro base station in step 812. That is, the small base station measures reception strength and an SNR of a received signal via the RACH and reports the same to the macro base station.

The small base station transmits a common pilot signal in accordance with time/frame synchronization obtained for the macro base station in step 814. Here, a transmission time of the common pilot signal of the small base station is determined depending on a point of receiving a preamble from the macro base station as described in step 802.

The small base station determines whether a handover request message is received from the macro base station in step 816. When the handover request message is not received, the small base station returns to step 808 and performs the subsequent steps.

In contrast, when the handover request message is received, the small base station proceeds to step 818 to transmit a handover response message to the macro base station, perform a handover procedure for a relevant terminal in step 820, and returns to step 808 and perform the subsequent steps.

Figure 9:
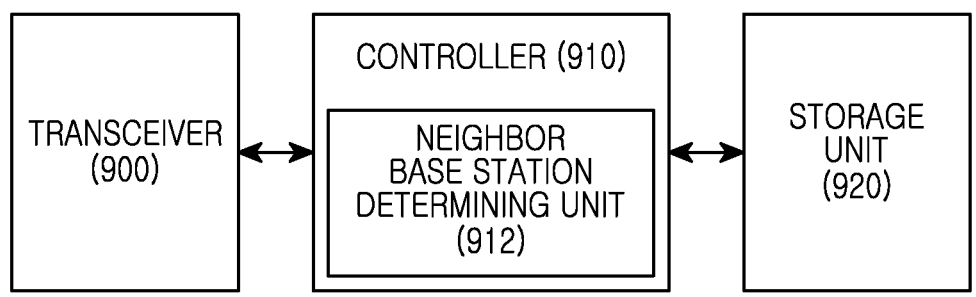
FIG. 9 is a block diagram illustrating a macro base station in a wireless communication system of a hierarchical cell structure according to an exemplary embodiment of the present invention.

FIG. 9 is a block diagram illustrating a macro base station in a wireless communication system of a hierarchical cell structure according to an exemplary embodiment of the present invention.

Referring to FIG. 9, the macro base station includes a transceiver 900, a controller 910, and a storage unit 920. The controller 910 includes a neighbor base station determining unit 912.

The transceiver 900 transmits/receives a signal to/from a terminal inside a coverage under control of the controller 910, and transmits/receives a signal to/from a small base station via a wired line or wirelessly.

The controller 910 controls and processes an overall operation of the macro base station, and controls and processes an operation for a handover of the terminal. More particularly, the controller 910 includes the neighbor base station determining unit 912 to control and process a function for determining small base stations adjacent to the terminal and transmitting information regarding the adjacent small base stations to the terminal in order to allow the terminal to perform a handover to the small base station.

The neighbor base station determining unit 912 controls a function for transmitting resource information allocated for the RACH of the terminal to a small base station positioned in the neighborhood. When channel state information for an RACH of a specific terminal received from a small base station is received, the neighbor base station determining unit 912 controls and processes a function for determining a small base station adjacent to the specific terminal based on the received channel state information, generating a candidate neighbor base station list including information of the determined small base stations, and transmitting the list to the specific terminal. More particularly, the neighbor base station determining unit 912 controls and processes a function for incorporating cell IDs (and/or sector IDs) of the determined small base stations into the candidate neighbor base station list and transmitting the same.

The storage unit 920 stores various programs for an overall operation of the macro base station, and data. More particularly, the storage unit 920 stores cell ID (and/or sector ID) information of neighbor small base stations.

Figure 10:
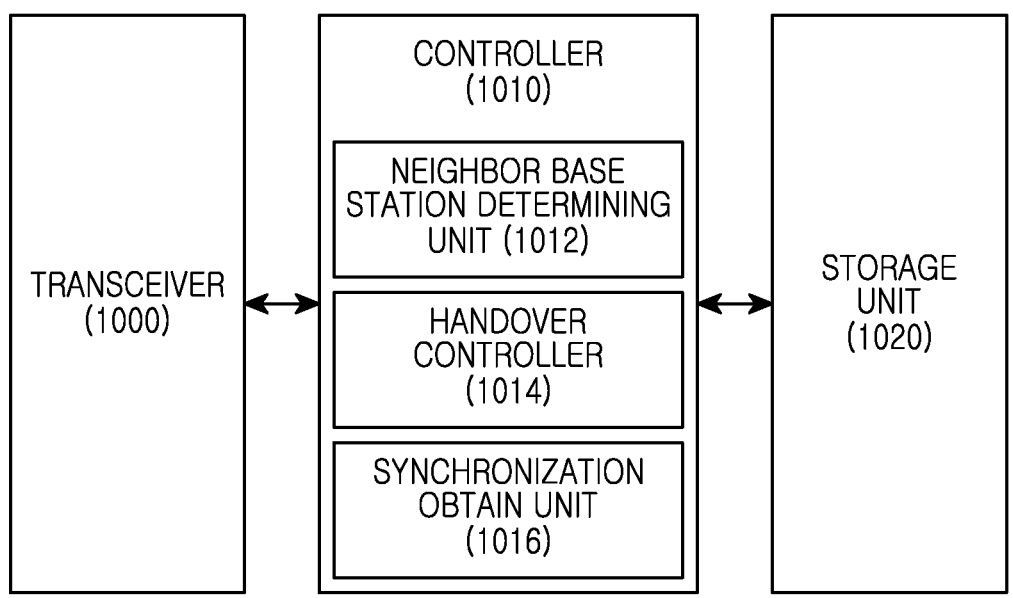
FIG. 10 is a block diagram illustrating a macro terminal in a wireless communication system of a hierarchical cell structure according to an exemplary embodiment of the present invention.

FIG. 10 is a block diagram illustrating a macro terminal in a wireless communication system of a hierarchical cell structure according to an exemplary embodiment of the present invention.

Referring to FIG. 10, the terminal includes a transceiver 1000, a controller 1010, and a storage unit 1020. The controller 1010 includes a neighbor base station determining unit 1012, a handover controller 1014, and a synchronization obtain unit 1016.

The transceiver 1000 performs a function for transmitting/receiving a signal to/from a base station under control of the controller 1010. More particularly, the transceiver 1000 receives a candidate neighbor base station list including a cell ID of a neighbor small base station from a macro base station and transmits the list to the controller 1010 under control of the controller 1010, and receives a common pilot signal from a small base station and provides the same to the controller 1010.

The controller 1010 controls and processes an overall operation of the terminal, and controls and processes a function for transmitting a signal via an RACH in order to obtain synchronization with a macro base station and fine-control the obtained synchronization. More particularly, when the candidate neighbor base station list is received from the macro base station via the neighbor base station determining unit 1012, the controller 1010 controls and processes a function for obtaining cell IDs (and/or sector IDs) of small base stations included in the candidate neighbor base station list, receiving a common pilot signal from relevant small base stations to measure reception strength or an SNR of the common pilot signal, and determining a small base station adjacent to the terminal. In addition, the controller 1010 controls and processes a function for determining whether to perform a handover to the determined small base station via the handover controller 1014 and performing a handover to the neighbor small base station.

Additionally, the controller 1010 includes the synchronization obtain unit 1016 to control and process a function for obtaining time/frame synchronization using a preamble received from the macro base station when initially accessing the macro base station, and controls and processes a function for obtaining time/frame synchronization for a small base station depending on the speed and the position of the terminal. That is, when receiving a cell ID for a neighbor small base station from the macro base station while the terminal moves in low speed, the synchronization obtain unit 1016 controls a function for receiving a common pilot signal transmitted from a small base station corresponding to the received cell ID, and controls and processes a function for obtaining time/frame synchronization for a relevant small base station based on the received common pilot signal. That is, the synchronization obtain unit 1016 determines a fine synchronization error using the common pilot signal based on the time/frame synchronization obtained for the macro base station, and controls and processes a function for obtaining time/frame synchronization for the small base station based on the determined fine synchronization error.

The storage unit 1020 stores various programs for an overall operation of the terminal and data. More particularly, the storage unit 1020 stores cell ID (and/or sector ID) information of neighbor small base stations determined in the neighbor base station determining unit 1012.

Figure 11:
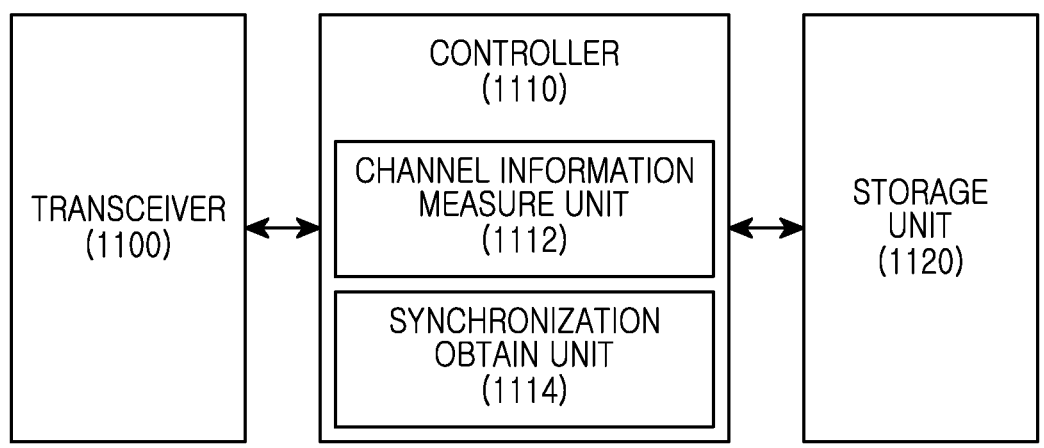
FIG. 11 is a block diagram illustrating a small base station in a wireless communication system of a hierarchical cell structure according to an exemplary embodiment of the present invention.

FIG. 11 is a block diagram illustrating a small base station in a wireless communication system of a hierarchical cell structure according to an exemplary embodiment of the present invention.

Referring to FIG. 11, the small base station includes a transceiver 1100, a controller 1110, and a storage unit 1120. More particularly, the controller 1110 includes a channel information measure unit 1112 and a synchronization obtain unit 1114.

The transceiver 1100 transmits/receives a signal to/from a terminal inside a coverage under control of the controller 1110, and transmits/receives a signal to/from a macro base station via a wired line or wirelessly. In addition, during a listening interval set in advance, the transceiver 1100 receives a preamble of the macro base station to provide the same to the controller 1110 under control of the controller 1110, and transmits a common pilot signal under control of the controller 1110. The controller 1110 controls and processes an overall operation of the small base station, and controls and processes an operation for a handover of the terminal. More particularly, the controller 1110 includes the channel information measure unit 1112 to control and process a function for receiving a signal of an RACH which a neighbor terminal receiving a service from a macro base station transmits to the macro base station to measure channel state information, and transmitting the same to the macro base station. Here, the channel information measure unit 1112 may receive a signal of an RACH which the terminal transmits to the macro base station by receiving resource information allocated for the RACH in advance from the macro base station.

Additionally, the controller 1110 includes the synchronization obtain unit 1114 to perform a function for time/frame synchronization with the macro base station using a preamble of the macro base station. After the time/frame synchronization with the macro base station, the controller 1110 controls and processes a function for transmitting/receiving a signal according to the time/frame synchronization. More particularly, the controller 1110 controls and processes a function for transmitting a common pilot signal.

The storage unit 1120 stores various programs for an overall operation of the small base station and data. More particularly, the storage unit 1120 stores resource information for an RACH allocated by the macro base station.

According to an exemplary embodiment of the present invention, in a wireless communication system of a hierarchical cell structure, a macro base station supports high speed and low speed users, and a small base station supports a low speed user, so that frequent occurrence of a handover may be prevented. A small base station does not transmit a preamble to improve a data transmission rate of the small base station. In addition, a small base station obtains synchronization using a preamble of a macro base station, so that a terminal may receive a signal from small base stations within a Cyclic Prefix (CP) to avoid interference between small cells. In addition, in a wireless communication system of a hierarchical cell structure, a small base station receives a random access channel signal which a macro terminal transmits to a macro base station to report the random access channel signal to the macro base station, and the macro base station receives an identifier of a small base station adjacent to the macro terminal to a terminal, so that the macro terminal may obtain a cell ID of the small base station even under a circumstance where the small base station does not transmit a preamble.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station in a wireless communication system, the method comprising:
   transmitting, to small base stations, information regarding resources for random access channel (RACH), wherein the resources are allocated to a terminal;
   receiving, from at least one of the small base stations, channel state information between the terminal and each of the at least one of the small base stations, wherein the channel state information is generated based on a RACH signal transmitted from the terminal; and
   transmitting, to the terminal, cell identifiers (IDs) of neighboring small base stations,
   wherein the RACH signal is transmitted by using the resources for the RACH, and
   wherein the neighboring small base stations are selected, from among the at least one of the small base stations, based on the channel state information.

2. The method of claim 1, further comprising:
receiving, from the terminal, a first request message for a handover from the base station to a target base station,
wherein the target base station is selected, from among the neighboring small base stations, based on pilot signals transmitted from the neighboring small base stations.

3. The method of claim 2, further comprising:
transmitting, to the target base station, a second request message for the handover;
receiving, from the target base station, response message according to the second request message; and
transmitting, to the terminal, a command message for the handover.

4. The method of claim 2,
wherein the pilot signals are transmitted from the neighboring small base stations synchronized with the base station based on a signal transmitted from the base station, and
wherein the handover is performed by the terminal synchronized with the target base station based on a pilot signal of the target base station.

5. The method of claim 1, wherein the channel state information comprises at least one of reception strength for the RACH signal and a signal to noise ratio (SNR) for the RACH signal.

6. The method of claim 1, wherein the information regarding resources for the RACH comprises a transmission point of the RACH signal and sequence code information of the RACH signal.

7. The method of claim 1, further comprising:
transmitting a preamble for synchronizing with the small base stations.

8. A method for operating a small base station in a wireless communication system, the method comprising:
receiving, from a base station, information regarding resources for a random access channel (RACH), wherein the resources are allocated to a terminal;
receiving a RACH signal transmitted from the terminal by using the information regarding the resources for the RACH;
transmitting, to the base station, channel state information between the terminal and the small base station; and
when the small base station is selected from among neighboring small base stations, transmitting a pilot signal to the terminal,
wherein the RACH signal is received by the neighboring small base stations, and
wherein the pilot signal is transmitted from the small base station synchronized with the base station based on a signal transmitted from the base station.

9. The method of claim 8, wherein the channel state information comprises at least one of reception strength for the RACH signal and a signal to noise ratio (SNR) for the RACH signal.

10. The method of claim 8, further comprising:
receiving, from the base station, a request message for a handover from the base station to the small base station,
wherein the handover is performed by the terminal synchronized with the small base station based on the pilot signal.

11. The method of claim 8, wherein the small base station does not transmit, to the terminal, a preamble for synchronizing with the terminal.

12. The method of claim 8, wherein the information regarding resources for the RACH comprises a transmission point of the RACH signal and sequence code information of the RACH signal.

13. A method for operating a terminal in a wireless communication system, the method comprising:
transmitting a random access channel (RACH) signal to a base station;
receiving at least one pilot signal transmitted from at least one neighboring small base station that is synchronized with the base station connected with the terminal;
selecting, from among the at least one neighboring small base station, a target base station based on the at least one pilot signal; and
performing a handover from the base station to the target base station by obtaining synchronization with the target base station based on a pilot signal of the target base station,
wherein the pilot signal is transmitted according to a timing determined, by the target base station, based on a signal transmitted from the base station,
wherein the base station is configured to transmit information regarding resources for a RACH allocated to the terminal to each of the plurality of small base stations, and
wherein the at least one neighboring small base station is identified among a plurality of small base stations based on the RACH signal which is received by each of the plurality of small base stations by using the resources.

14. The method of claim 13, wherein the terminal does not receive, from the at least one neighboring small base station, a preamble for synchronizing with the at least one neighboring small base station.

15. An apparatus of a base station in a wireless communication system, the apparatus comprising:
a processor; and
at least one transceiver operatively coupled with the processor,
wherein the processor is configured to:
transmit, to small base stations, information regarding resources for random access channel (RACH), wherein the resources are allocated to a terminal;
receive, from at least one of the small base stations, channel state information between the terminal and each of the at least one of the small base stations, wherein the channel state information is generated based on a RACH signal transmitted from the terminal; and
transmit, to the terminal, cell identifiers (IDs) of neighboring small base stations,
wherein the RACH signal is transmitted by using the resources for the RACH, and
wherein the neighboring small base stations are selected, from among the at least one of the small base stations, based on the channel state information.

16. The apparatus of claim 15, wherein the processor is further configured to receive, from the terminal, a first request message for a handover from the base station to a target base station,
wherein the target base station is selected, from among the neighboring small base stations, based on pilot signals transmitted from the neighboring small base stations.

17. The apparatus of claim 16, wherein the processor is further configured to:
transmit, to the target base station, a second request message for the handover;
receive, from the target base station, a response message according to the second request message; and
transmit, to the terminal, a command message for the handover.

18. The apparatus of claim 16, wherein the pilot signals are transmitted from the neighboring small base stations synchronized with the base station based on a signal transmitted from the base station, and
wherein the handover is performed by the terminal synchronized with the target base station based on a pilot signal of the target base station.

19. The apparatus of claim 15, wherein the channel state information comprises at least one of reception strength for the RACH signal and a signal to noise ratio (SNR) for the RACH signal.

20. The apparatus of claim 15, wherein the information regarding resources for the RACH comprises a transmission point of the RACH signal and sequence code information of the RACH signal.

21. The apparatus of claim 15, wherein the processor is further configured to transmit a preamble for synchronizing with the small base stations.

22. An apparatus of a small base station in a wireless communication system, the apparatus comprising:
a processor; and
at least one transceiver coupled with the processor,
wherein the processor is configured to:
receive, from a base station, information regarding resources for a random access channel (RACH), wherein the resources are allocated to a terminal;
receive a RACH signal transmitted from the terminal by using the information regarding the resources for the RACH;
transmit, to the base station, channel state information between the terminal and the small base station; and
transmit a pilot signal to the terminal, when the small base station is selected from among neighboring small base stations,
wherein the RACH signal is received by the neighboring small base stations, and
wherein the pilot signal is transmitted from the small base station synchronized with the base station based on a signal transmitted from the base station.

23. The apparatus of claim 22, wherein the channel state information comprises at least one of reception strength for the RACH signal and a signal to noise ratio (SNR) for the RACH signal.

24. The apparatus of claim 22, wherein the processor is further configured to receive, from the base station, a request message for a handover from the base station to the small base station, and
wherein the handover is performed by the terminal synchronized with the small base station based on the pilot signal.

25. The apparatus of claim 22, wherein the small base station does not transmit, to the terminal, a preamble for synchronizing with the terminal.

26. The apparatus of claim 22, wherein the information regarding resources for the RACH comprises a transmission point of the RACH signal and sequence code information of the RACH signal.

27. An apparatus of a terminal in a wireless communication system, the apparatus comprising:
a processor; and
at least one transceiver coupled with the processor,
wherein the processor is configured to:
transmit a random access channel (RACH) signal to a base station,
receive at least one pilot signal transmitted from at least one neighboring small base station that is synchronized with a base station that is connected with the terminal;
select, from among the at least one neighboring small base station, a target base station based on the at least one pilot signal; and
perform a handover from the base station to the target base station by obtaining synchronization with the target base station based on a pilot signal of the target base station, and
wherein the pilot signal is transmitted according to a timing determined, by the target base station, based on a signal transmitted from the base station,
wherein the base station is configured to transmit information regarding resources for a RACH allocated to the terminal to each of the plurality of small base stations, and
wherein the at least one neighboring small base station is identified among a plurality of small base stations based on the RACH signal which is received by each of the plurality of small base stations by using the resources.

28. The apparatus of claim 27, wherein the terminal does not receive, from the at least one neighboring small base station, a preamble for synchronizing with the at least one neighboring small base station.

* * * * *